No. 778,084. Patented December 20, 1904.

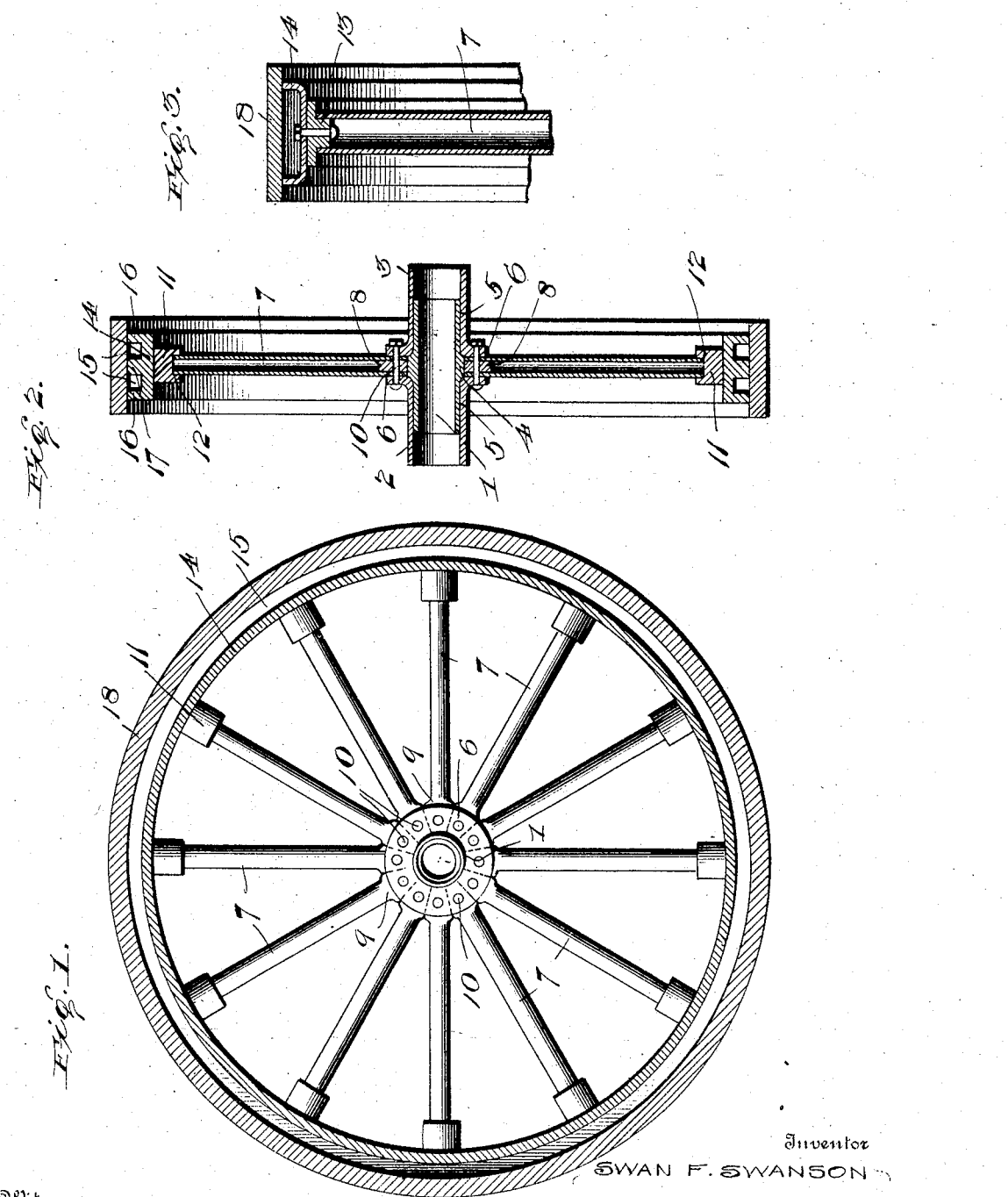

UNITED STATES PATENT OFFICE.

SWAN F. SWANSON, OF PUEBLO, COLORADO.

VEHICLE-WHEEL.

SPECIFICATION forming part of Letters Patent No. 778,084, dated December 20, 1904.

Application filed May 13, 1904. Serial No. 207,739.

*To all whom it may concern:*

Be it known that I, SWAN F. SWANSON, a citizen of the United States, residing at Pueblo, in the county of Pueblo and State of Colorado, have invented certain new and useful Improvements in Vehicle-Wheels; and I do declare the following to be a full, clear, and exact description of the invention, such as will enable others skilled in the art to which it appertains to make and use the same.

My invention is an improved vehicle-wheel; and it consists in the construction, combination, and arrangement of devices hereinafter described and claimed.

In the accompanying drawings, Figure 1 is partly an elevation and partly a sectional view of a vehicle-wheel embodying my invention. Fig. 2 is a transverse sectional view of the same. Fig. 3 is a detail section showing a modification.

The hub of my improved wheel comprises a central tubular section 1 and a pair of end sections 2 3. The inner section 1, which bears directly on the axle-spindle, is provided at its center, on its outer side, with an annular enlargement 4, forming a circumferential flange. The sections 2 3 have their inner sides recessed, as at 5, to receive the said inner section and its annular enlargement 4, and the said sections 2 3, the inner ends of which abut against the said flange 4, are provided at their inner ends with annular flanges 6, which form a space between them and opposite the annular flange or enlargement 4 of the inner section to receive the inner ends of the spokes. The sections 2 3 project beyond the ends of the inner section, as shown. Each of the said sections 1, 2, and 3 is preferably made of steel or iron, but may be made of any suitable material.

Each spoke 7 is a tube and may be made of iron, steel, or any other suitable material. The inner end of each spoke is filled with a plug 8, which is welded thereto, and the inner ends of the spokes are of angular sector shape, as at 9, to enable them to bear against one another and to fit snugly between the flanges 6 of the hub-sections 2 3. The said hub-sections are bolted together by bolts 10, which bolts pass through coincident openings in the opposing sides of the sector-shaped inner ends of the spokes, as shown. Thereby the spokes are also firmly secured between the end sections of the hub and with their inner ends bearing on the annular flanged or enlarged portion 4 of the inner section 1.

At the outer ends of the spokes are washers 11, which in the form of my invention shown in Figs. 1 and 2 are recessed, as at 12, to receive the ends of the spokes, and in the modification shown in Fig. 3 are provided each with a projection or boss 13 to enter the outer end of the tubular spoke. I do not limit myself in this particular. The felly 14 has annular channels 15 in its outer side, each forming side flanges 16, and an intermediate flange 17. The tire 18 engages the said flanges. The washers bear against the inner side of the felly and are bolted or otherwise suitably secured thereto.

Having thus fully described my invention, what I claim as new, and desire to secure by Letters Patent, is—

1. A vehicle-wheel having a hub comprising an inner tubular section having an annular enlargement forming a circumferential flange on its outer side at a point between its ends, said flange having outwardly-converging sides, tubular end sections on the said section, having their inner ends formed to bear against the sides of the said flange, spokes having segmental inner ends bearing directly against the outer side of said flange and in contact with one another, and means to clamp the end sections against the converging sides of the said flange and against opposite sides of the said spokes.

2. A wheel having a hub comprising an inner tubular section having an annular enlargement forming a circumferential flange on its outer side at a point between its ends, end sections on the said section and having flanges at their inner ends, hollow spokes having segmental inner ends bearing on the flange of the inner section and between the flanges of the end sections, plugs in the inner ends of the hollow spokes, and bolts extending through the flanges of the end sections, the spokes and the plugs therein, and securing the end sections and spokes together.

In testimony whereof I have hereunto set my hand in presence of two subscribing witnesses.

SWAN F. SWANSON.

Witnesses:
 J. P. JOHNSON,
 C. H. BLACK.